(12) United States Patent
Yoshimi et al.

(10) Patent No.: US 6,825,990 B2
(45) Date of Patent: Nov. 30, 2004

(54) ZOOM LENS AND IMAGE PICKUP APPARATUS

(75) Inventors: Takahiro Yoshimi, Tochigi (JP); Fumiaki Usui, Tochigi (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 10/649,151

(22) Filed: Aug. 27, 2003

(65) Prior Publication Data

US 2004/0042075 A1 Mar. 4, 2004

(30) Foreign Application Priority Data

Aug. 28, 2002 (JP) .......... 2002-248367
Aug. 8, 2003 (JP) .......... 2003-290783

(51) Int. Cl.[7] .......... G02B 15/14
(52) U.S. Cl. .......... 359/692; 359/691
(58) Field of Search .......... 359/689–692, 359/380

(56) References Cited

U.S. PATENT DOCUMENTS

| 3,549,235 | A | | 12/1970 | Marcher |
| 3,563,636 | A | | 2/1971 | Marcher et al. |
| 5,218,476 | A | * | 6/1993 | Ito .......... 359/676 |
| 5,831,771 | A | | 11/1998 | Suzuki |
| 6,052,225 | A | * | 4/2000 | Hoshi .......... 359/432 |
| 6,327,100 | B1 | | 12/2001 | Yamanashi |
| 6,510,009 | B2 | * | 1/2003 | Nishimura .......... 359/692 |

FOREIGN PATENT DOCUMENTS

| DE | 16 47 001 A | 1/1971 |
| DE | 14 97 560 B | 5/1971 |
| EP | 0 752 605 A | 1/1997 |
| GB | 11 09913 A | 4/1968 |
| GB | 1 126 069 A | 9/1968 |
| JP | 8-184758 | 7/1996 |

OTHER PUBLICATIONS

European Search Report, completed Nov. 20, 2003.

* cited by examiner

*Primary Examiner*—Ricky Mack
(74) *Attorney, Agent, or Firm*—Morgan & Finnegan, LLP (57) ABSTRACT

A small-sized and light weight zoom lens achieving high optical performance, a wide angle of view, and a high magnification, is disclosed. The zoom lens comprises, in order form the object side, a first lens unit with positive optical power, a second lens unit with negative optical power having a magnification varying function, and at least one other lens unit. The first lens unit includes, in order from the object side, a first negative lens element the object side surface of which is concave toward the object side, a second negative lens element, and a positive lens element.

7 Claims, 12 Drawing Sheets

ZOOM LENS AND IMAGE PICKUP APPARATUS

BACKGROUND OF THE INVENTION

1. Field of the Invention

The present invention relates to a zoom lens with a wide angle of view and a high magnification, suitable for an image pickup apparatus such as a digital still camera, a video camera, or a television camera, etc.

2. Description of Related Art

Conventionally, a zoom lens comprising, in order from the object side, a first lens unit with positive optical power, a second lens unit with negative optical power, having a magnification varying function, and at least one other lens unit has been known. In this zoom lens, the first lens unit is provided with a retro focus type optical arrangement including a first lens component having negative optical power and a second lens component having positive optical power, wherein the first lens component has, in order from the object side, one negative lens element whose concave surface is faced to the object side, and one or more lens elements. Such a zoom lens is disclosed in Japanese Patent Application Laid-Open No. H08(1996)-184758 (corresponding to U.S. Pat. No. 5,831,771).

In such a zoom lens, since the back side principal point of the first lens unit is pushed out toward the image plane side, the effective diameter of the first lens unit can be reduced to be comparatively small. Therefore, this zoom lens is frequently used as a wide-angle and high-magnification zoom lens whose zooming ratio exceeds 10 times.

Herein, for the zoom lens, reduction in size and weight has been strongly demanded as well as achievement of both a wide angle of view and a high magnification.

However, in the conventional structure such as disclosed in Japanese Patent Application Laid-Open No. H08(1996)-184758 (corresponding to U.S. Pat. No. 5,831,771), when it is attempted to realize a smaller size while achieving a wider angle of view, it becomes necessary to increase the negative optical power of the first lens component and the positive optical power of the second lens component.

If the positive optical power of the second lens component increases, positive distortion increases at a zooming position (focal length) of $fw \times Z^{1/4}$ provided that the focal length at the wide-angle end is fw and the zooming ratio is Z.

Furthermore, in addition to the increase in the negative optical power of the first lens component, in a case where the positive distortion is corrected, on the assumption that the maximum height of the maximum image height off-axis light ray at the wide-angle end in a condition where the object distance is infinity is defined as hw, and the same at a zooming position of $fw \times Z^{1/4}$ is defined as hz, the radius of curvature of the first surface (surface of the object side) of the negative lens element in the first lens component, satisfying hw<hz, becomes smaller.

As a result, the light ray incident angle onto the first surface of the negative lens element in the first lens unit increases, and distortion components in chromatic aberration of magnification significantly increase although positive distortion is satisfactorily corrected.

In order to correct this, it is necessary to make Abbe's number of the negative lens element in the first lens unit larger, however, this results in insufficient correction of axial chromatic aberration at the telephoto end, and it becomes difficult to achieve a wider angle and a higher magnification while maintaining high optical performance, furthermore, a smaller size and a lighter weight.

SUMMARY OF THE INVENTION

An object of the invention is to provide a small-sized lightweight zoom lens with a wide angle of view and a high magnification, having high optical performance by setting the lens structure and conditions properly.

In order to achieve the abovementioned object, according to one aspect of the invention, a zoom lens comprises, in order from the object side, a first lens unit having positive optical power, a second lens unit having negative optical power and has a magnification varying function, and at least one other lens unit. The first lens unit includes, in order from the object side, a first negative lens element whose object side surface is concave toward the object side, and a second negative lens element, and at least one positive lens element is closer to the image plane side than the second negative lens element. And the zoom lens satisfies the following condition:

$$-1.28 < fn/f1$$

where fn denotes the composite focal length of the first negative lens element and the second negative lens element, and f1 denotes the focal length of the first lens unit.

The characteristics of a zoom lens and an image pickup apparatus of the invention become clear by the following detailed description with reference to the accompanying drawings.

DETAILED DESCRIPTION OF THE PREFERRED EMBODIMENTS

Hereinafter, Embodiments of the present invention are described with reference to the accompanying drawings.

Figure 1:
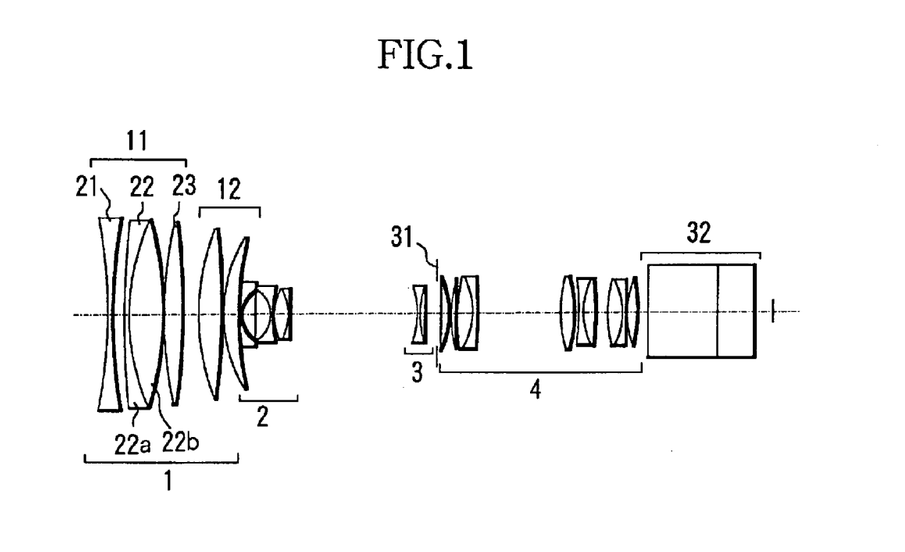
FIG. 1 is a sectional view of a zoom lens of Embodiment 1 of the invention when it is at the wide-angle end and focused to infinity.
Figure 2:
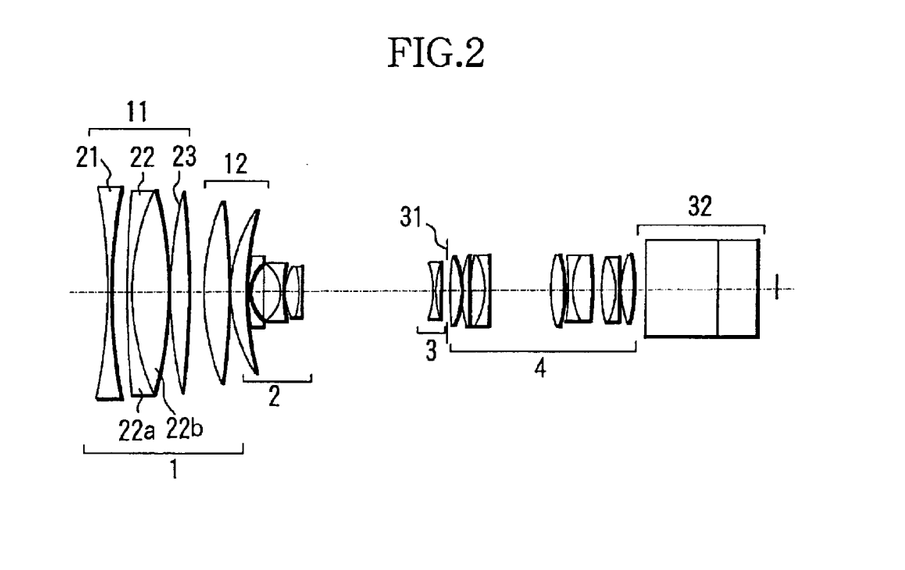
FIG. 2 is a sectional view of a zoom lens of Embodiment 2 of the invention when it is at the wide-angle end and focused to infinity.
Figure 3:
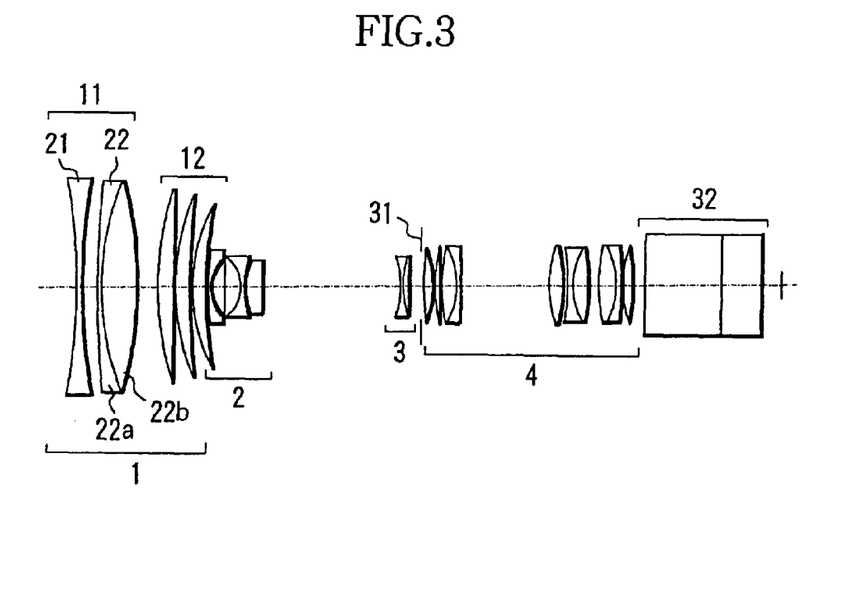
FIG. 3 is a sectional view of a zoom lens of Embodiment 3 when it is at the wide-angle end and focused to infinity.
Figure 4:
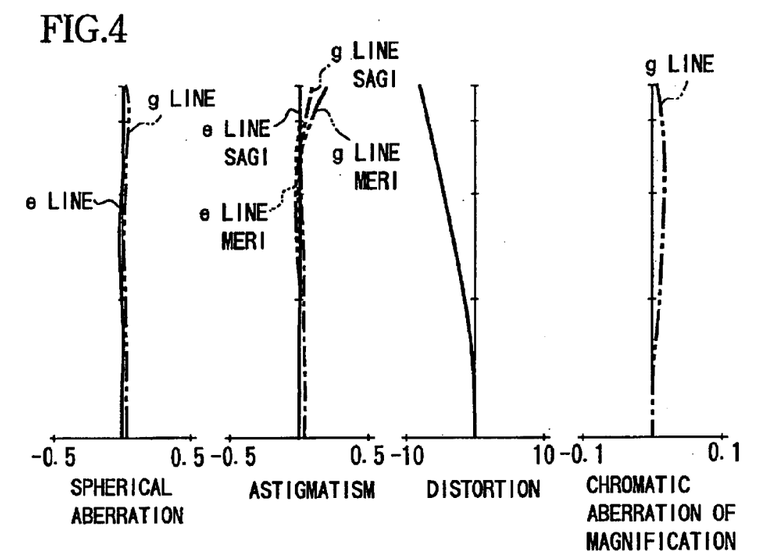
FIG. 4 are aberration diagrams of Embodiment 1 when the lens is at the wide-angle end and focused to infinity.
Figure 5:
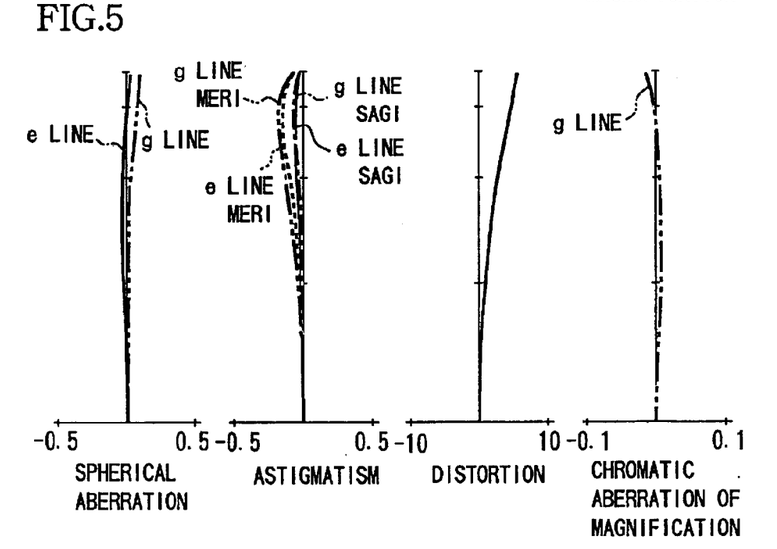
FIG. 5 are aberration diagrams of Embodiment 1 when the lens is focused to infinity at a focal length of $fw \times Z^{1/4}$.
Figure 6:
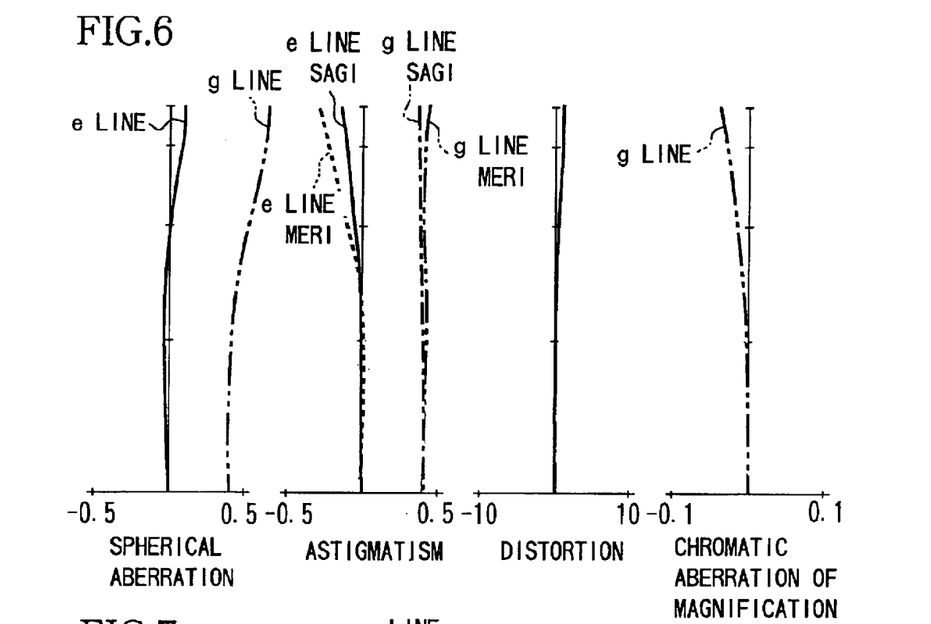
FIG. 6 are aberration diagrams of Embodiment 1 when the lens is at the telephoto end and focused to infinity.
Figure 7:
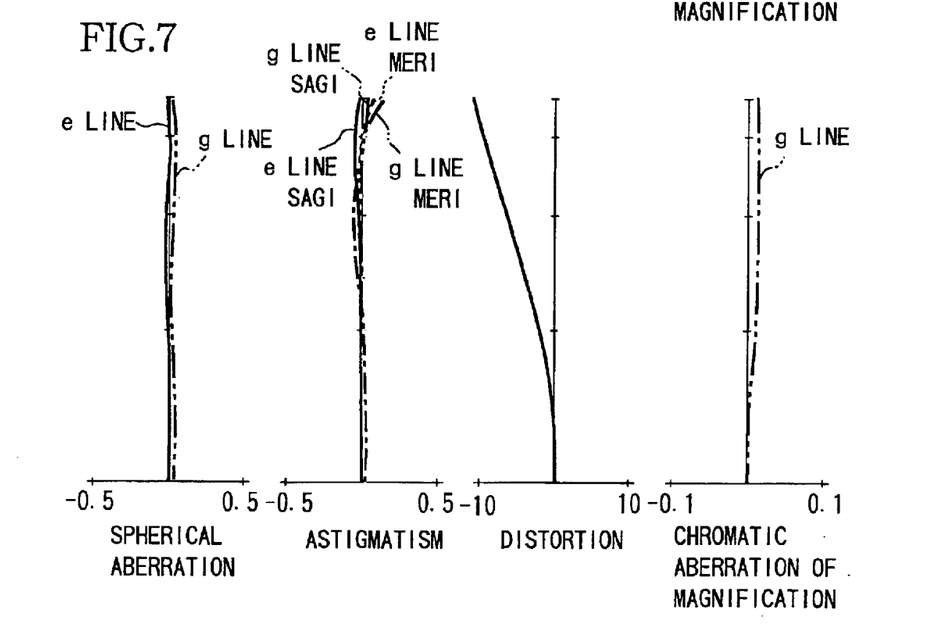
FIG. 7 are aberration diagrams of Embodiment 2 when the lens is at the wide-angle end and focused to infinity.
Figure 8:
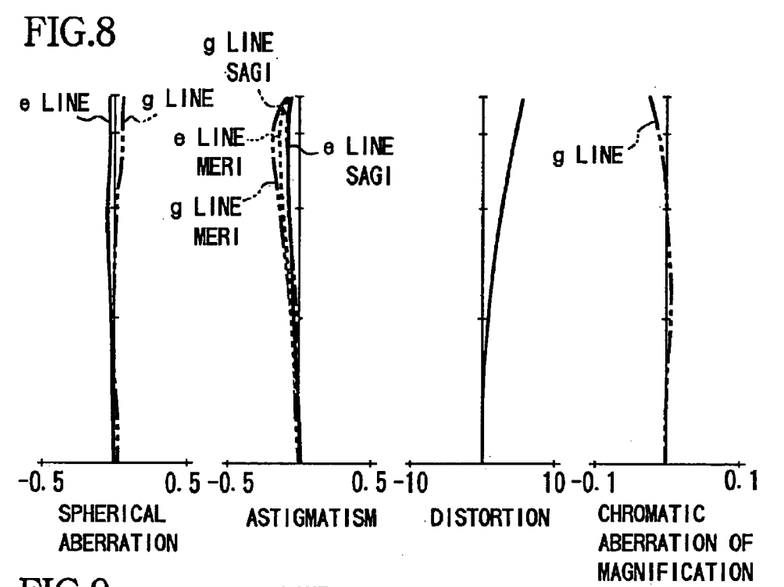
FIG. 8 are aberration diagrams of Embodiment 2 when the lens is focused to infinity at a focal length of $fw \times Z^{1/4}$.
Figure 9:
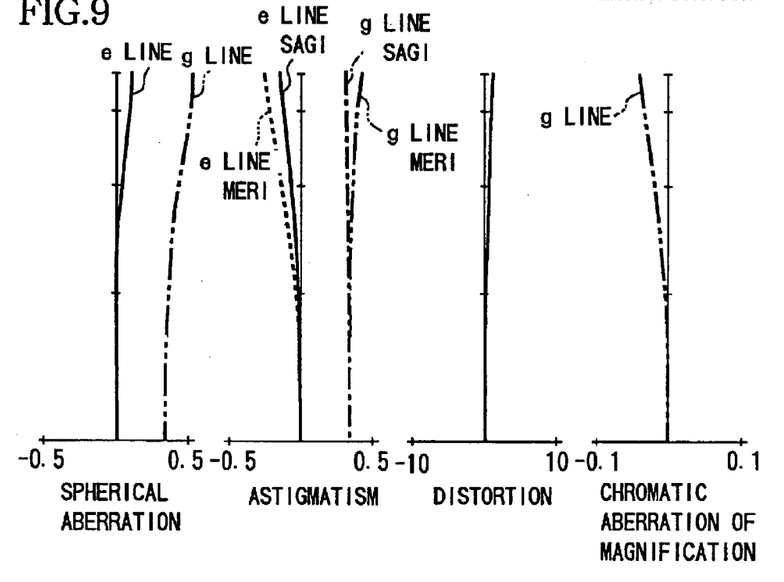
FIG. 9 are aberration diagrams of Embodiment 2 when the lens is at the telephoto end and focused to infinity.
Figure 10:
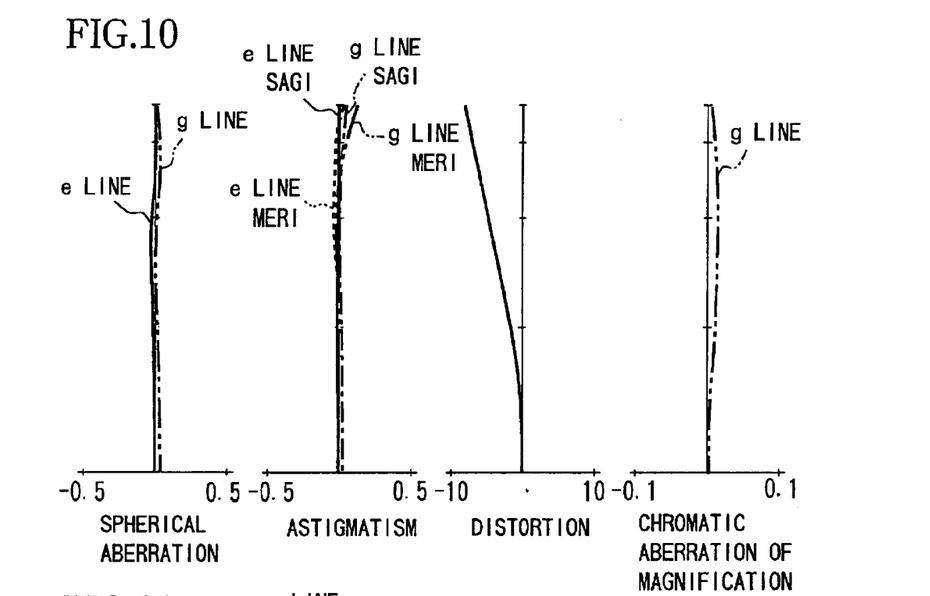
FIG. 10 are aberration diagrams of Embodiment 3 when the lens is at the wide-angle end and focused to infinity.
Figure 11:
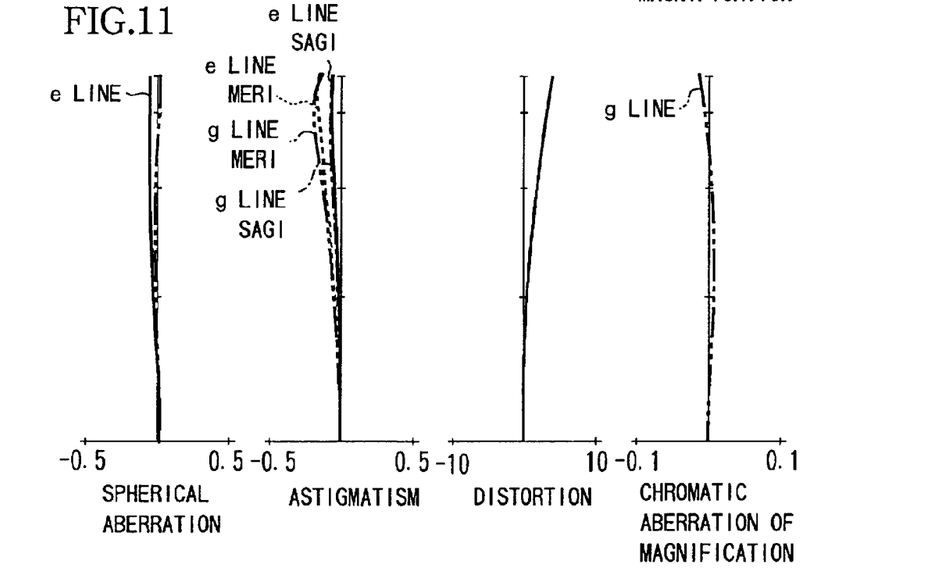
FIG. 11 are aberration diagrams of Embodiment 3 when the lens is focused to infinity at a focal length of $fw \times Z^{1/4}$.
Figure 12:
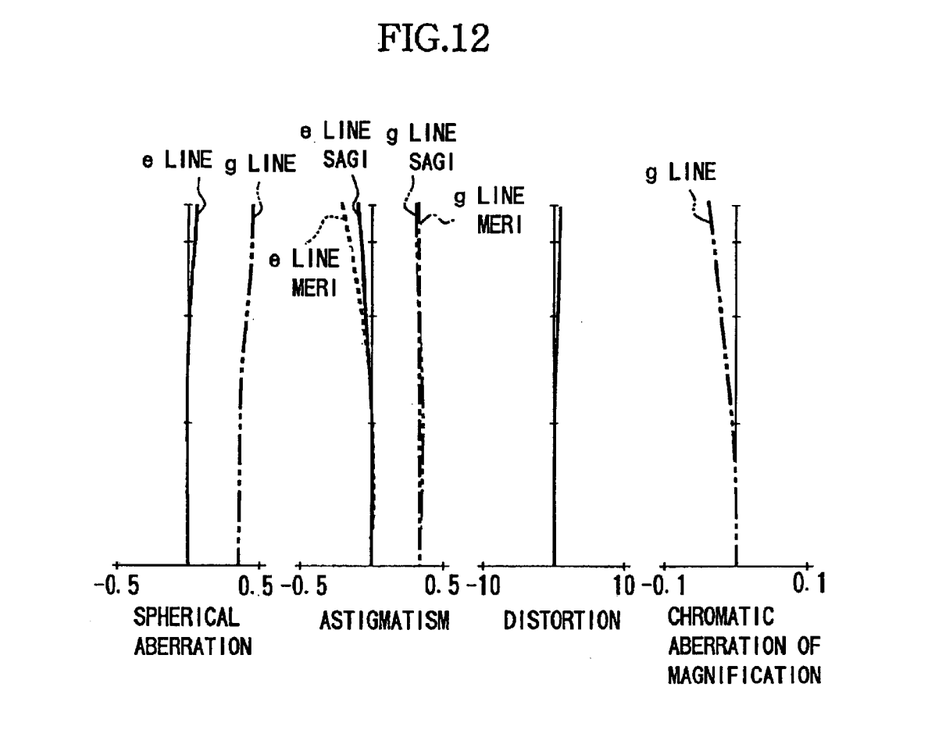
FIG. 12 are aberration diagrams of Embodiment 3 when the lens is at the telephoto end and focused to infinity.
Figure 13:
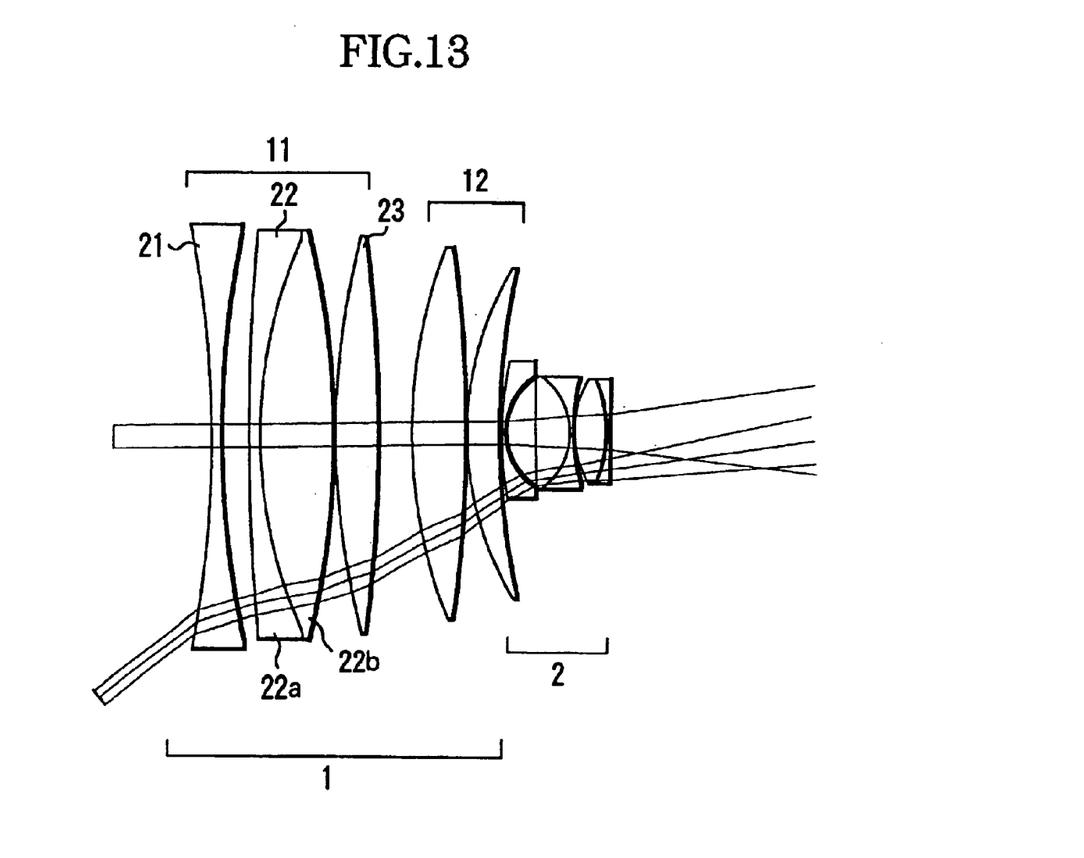
FIG. 13 is an optical path diagram of Embodiment 1 when the lens is at the wide-angle end and focused to infinity.
Figure 14:
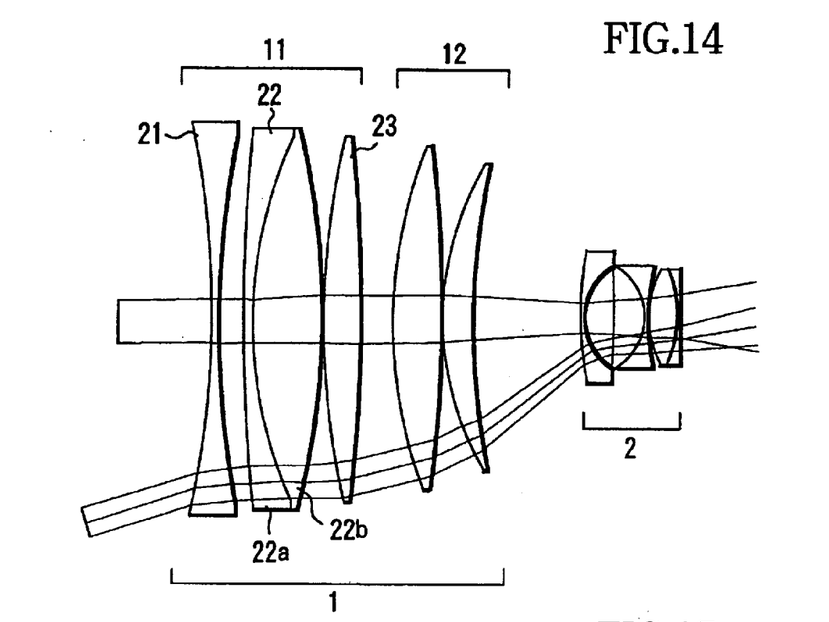
FIG. 14 is an optical path diagram of Embodiment 1 when the lens is focused to infinity at a focal length of $fw \times Z^{1/4}$.
Figure 15:
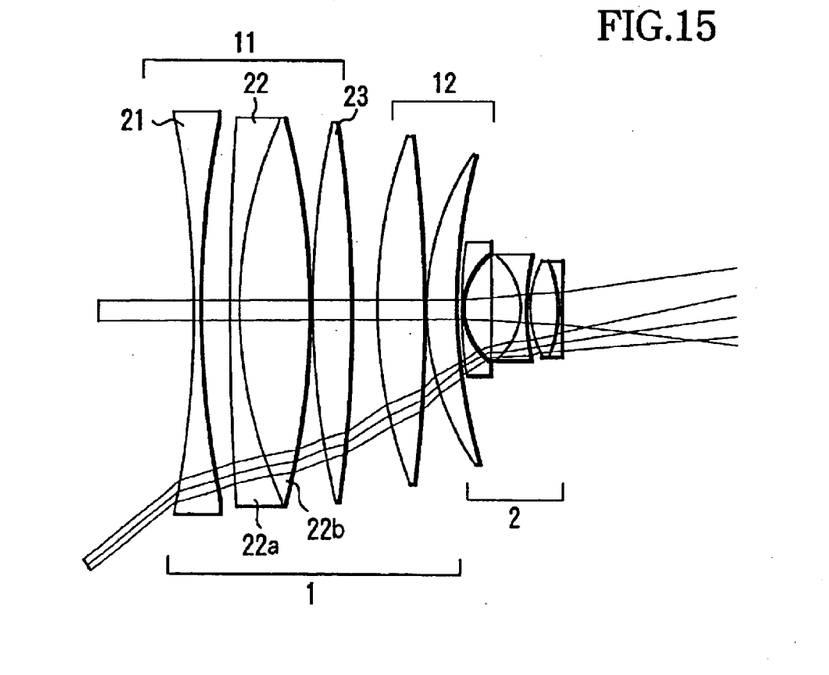
FIG. 15 is an optical path diagram of Embodiment 2 when the lens is at the wide-angle end and focused to infinity.
Figure 16:
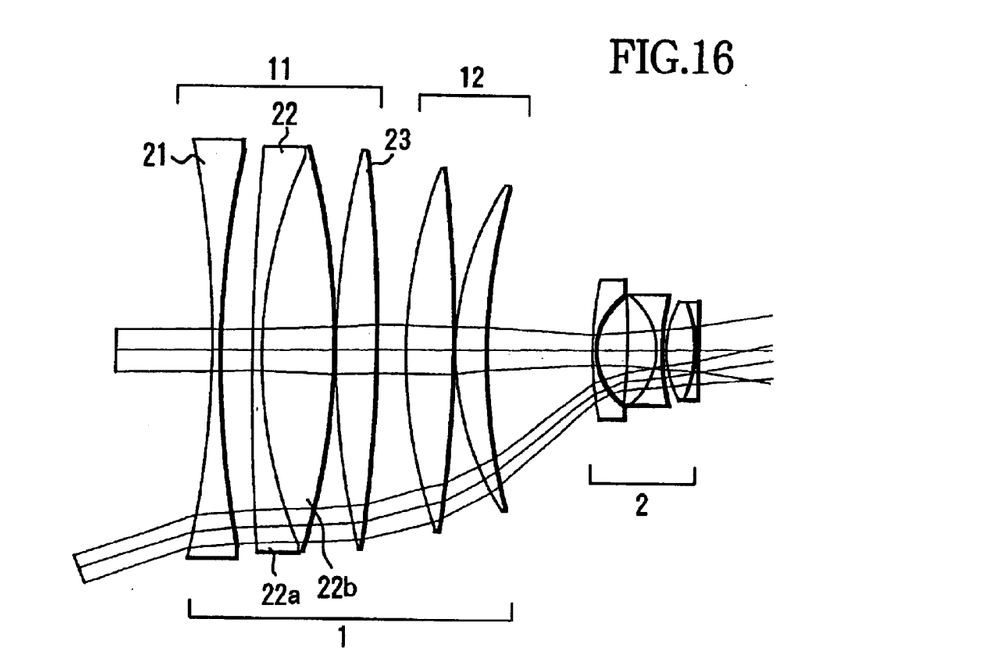
FIG. 16 is an optical path diagram of Embodiment 2 when the lens is focused to infinity at a focal length of fw×Z$^{1/4}$.
Figure 17:
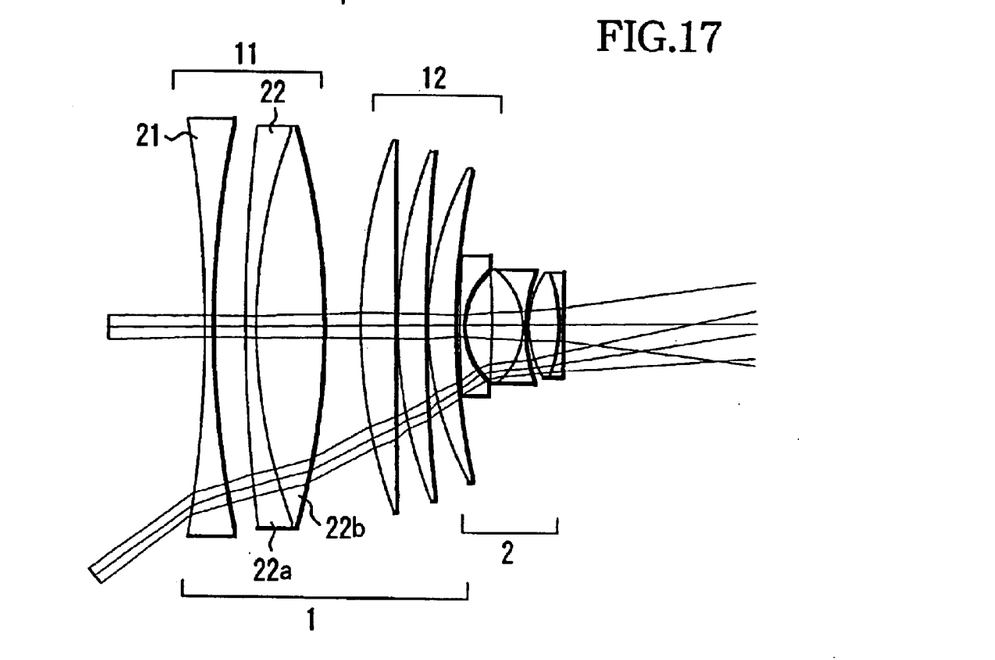
FIG. 17 is an optical path diagram of Embodiment 3 when the lens is at the wide-angle end and focused to infinity.
Figure 18:
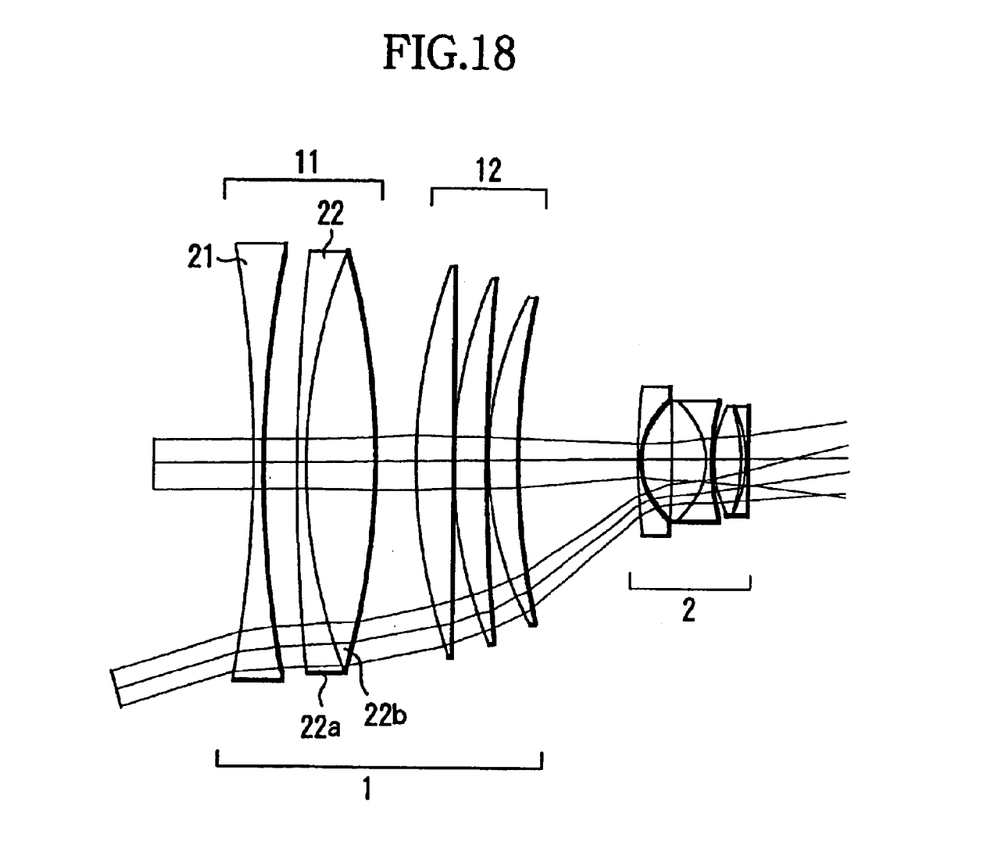
FIG. 18 is an optical path diagram of Embodiment 3 when the lens is focused to infinity at a focal length of fw×Z$^{1/4}$.

FIG. 1, FIG. 2, and FIG. 3 are sectional views of zoom lenses of respective Embodiments 1, 2, and 3 when they are at the wide-angle end and focused to infinity.

In FIG. 1, FIG. 2, and FIG. 3, in order from an object side (left side of the drawings), numerical reference 1 denotes a first lens unit which has a focusing function and has positive optical power. Numerical reference 2 denotes a second lens unit which has a magnification varying function by moving on the optical axis and has negative optical power. Numerical referee 3 denotes third lens unit which moves on the optical axis when varying the magnification and corrects image plane variation caused by magnification varying. Numerical reference 4 denotes a fourth lens unit which has a function forming an image on the image plane and has positive optical power.

Numerical reference 31 denotes an aperture stop. Numerical reference 32 denotes an optical unit including a color separating optical system and an optical filter, etc., which are shown by glass blocks corresponding to them in the figures.

The first lens unit 1 comprises, in order from the object side, a first lens component 11 which has negative optical power and is fixed when focusing, and a second lens component 12 which has positive optical power and moves on the optical axis when focusing.

The first lens component 11 includes, in order from the object side, a first negative lens element in which a first surface at the extreme object side is concave toward the object side, a second negative lens element, and at least one positive lens element.

In this embodiment, an example of the first lens component 11 which comprises, in order from the object side, a first negative lens element 21 and a second lens element unit 22 including a second negative lens element 22a and a positive lens element 22b is shown.

Thus, by making the first lens component 11 to include, in order from the object side, the negative lens element, the negative lens element, and at least one positive lens element, the radius of curvature of the first surface of the first negative lens element 21 can be increased even when the negative optical power of the first lens component 11 and the positive optical power of the second lens component 12 are increased for a wider field angle of view and reduction in size and in weight of the zoom lens. Therefore, it becomes possible to suppress distortion components in chromatic aberration of magnification while satisfactorily correcting positive distortion which becomes maximum at a zooming position of fw×Z$^{1/4}$ provided that the focal length at the wide-angle end is fw and the zooming ratio is Z.

Furthermore, in Embodiments 1 and 2, an example in which a positive lens element 23 is disposed closer to the image plane side than the positive lens element 22b is shown. By disposing this positive lens element 23, the height of refraction point of off-axis light ray at the wide-angle side can be lowered in addition to the abovementioned effects, so that the diameter of the front lens (the first lens component 11) can be reduced. Furthermore, in Embodiments 1, 2, and 3, a structure of, in order from the object side, negative, negative, and positive is employed, however, a structure of negative, negative, negative, and positive may be employed. With such a structure, the radius of curvature of the first surface of the first negative lens element 21 can be increased, and a glass material having a large Abbe's number can be used for the first negative lens element 21, so that suppression of distortion components in chromatic aberration of magnification is possible.

Furthermore, it is desirable that the following conditional expression is satisfied.

$$-1.28 < fn < f1 \tag{1}$$

Herein, fn denotes the composite focal length of the first negative lens element 21 and the second negative lens element 22a, and f1 denotes the focal length of the first lens unit 1. If the lower limit of Expression (1) is exceeded, it becomes difficult to simultaneously realize suppression of distortion components in chromatic aberration of magnification and a wider angle while correcting excellently positive distortion which increases at a zooming position of fw×Z$^{1/4}$ in the conventional structure. At the same time, the action of moving the principal point of the first lens unit 1 toward the second lens unit side is reduced, so that it becomes difficult to reduce the size of the entire zoom lens.

Furthermore, by satisfying the following conditional expression, it becomes possible to correct distortion components in chromatic aberration of magnification and axial chromatic aberration at the telephoto end while satisfactorily correcting positive distortion.

$$v1-v2>8 \tag{2}$$

$$v3>60 \tag{3}$$

Herein, v1 and v2 indicate Abbe's numbers of the first negative lens element 21 and the second negative lens element 22a, respectively. v3 denotes Abbe's number of the positive lens element which is disposed closer to the image plane side than the second negative lens element 22a and the closest to the object side within the first lens unit excluding the first negative lens element 21 and the second negative lens element 22a.

Expressions (2) and (3) indicate a condition required for achieving correction of both distortion components in chromatic aberration of magnification and axial chromatic aberration at the telephoto end. If v1–v2 and v3 are equal to or lower than the lower limit of Expressions (2) and (3), respectively, distortion components in chromatic aberration of magnification cannot be satisfactorily corrected, resulting in lowering in image quality.

Furthermore, in a case where the first lens component 11 constituting part of the first lens unit 1 comprises, in order from the object side, the first negative lens element 21 whose first surface is concave toward the object side, the second negative lens element 22a, and the positive lens element 22b, it is desirable that the zoom lens satisfies the following conditional expressions:

$$Z>10 \tag{4}$$

$$fw/IS<0.75 \tag{5}$$

Herein, Z denotes a zooming ratio, fw denotes a focal length of the entire system at the wide-angle end, and IS denotes an image size.

Expression (4) means that the zoom lens is a high-magnification zoom lens having a zooming ratio exceeding 10 times. If the zooming ratio Z becomes lower than the lower limit of Expression (4), it becomes unnecessary to increase the positive optical power of the first lens unit 1 and the negative optical power of the second lens unit 2, and distortion components in chromatic aberration of magnification can be suppressed while positive distortion is properly corrected even in the conventional structure. Therefore, the arrangement of a negative lens element, a negative lens element, and a positive lens element in order from the object side in the first lens component 11 becomes unnecessary.

Expression (5) means that the field angle at the wide-angle end is 67 degrees or more. When fw/IS becomes greater than the upper limit of (5), it becomes unnecessary to increase the positive optical power of the first lens unit 1 and the negative optical power of the second lens unit 2, and the arrangement of a negative lens element, a negative lens element, and a positive lens element in order from the object side in the first lens component 11 becomes unnecessary.

All zoom lenses of Embodiments 1, 2, and 3 are high-magnification and wide-angle zoom lenses satisfying Expressions (1), (2), (3), (4) and (5) as shown in Tables 1, 2, and 3 below, wherein the first lens component 11 comprises, in order from the object side, a negative lens element, a negative lens element, and a positive lens element.

Furthermore, in a case where the first lens component 11 constituting part of the first lens unit 1 includes, in order from the object side, the negative lens element 21 whose first surface is concave toward the object side, the second negative lens element 22a, and the positive lens element 22b, it is desirable that the following condition is satisfied:

hw<hz                                                 (6)

Herein, hw and hz show the maximum heights of off-axis light rays at the maximum image height, which pass through the first surface of the first lens unit 1 (the first negative lens element 21) when the zoom lens is focused to infinity at the wide-angle end and at a focal length of $fw \times Z^{1/4}$, respectively.

In such a zoom lens, in most cases, a negative lens element whose concave surface is faced to the image plane side is used as the first negative lens element 21 of the first lens unit 1. In the zoom lens satisfying Expression (5), in a case where positive distortion is corrected, correction by the first surface of the first negative lens element 21 in the first lens component 11 satisfying hw<hz is most suitable. Therefore, distortion components in chromatic aberration of magnification easily occur. Therefore, in the zoom lens satisfying Expression (6), the first lens component 11 is composed of, in order from the object side, a negative lens element, a negative lens element, and a positive lens element.

FIG. 13 through FIG. 18 are optical path diagrams showing off-axis light rays at the maximum image height that pass through the first surface of the first lens unit 1 at the wide-angle end and at a focal length of $fw \times Z^{1/4}$ in Embodiment 1, Embodiment 2, and Embodiment 3.

As shown in these figures and Tables 1 through 3, in this embodiment, in the zoom lenses satisfying Expression (6), the first lens component 11 includes a negative lens element, a negative lens element, and a positive lens element.

As a more preferable embodiment, it is desirable that the second negative lens element 22a and the positive lens element 22b, which form the first lens component 11, are cemented together.

The positive lens element 22b has a function to correct spherical aberration at the telephoto end, however, in a case where an air space exists between the second negative lens element 22a and the positive lens element 22b, the sensitivity of spherical aberration to the interval between the second negative lens element 22a and the positive lens element 22b increases, resulting in more production difficulty. Therefore, it is preferable that the second negative lens element 22a and the positive lens element 22b are cemented together to form the second lens element unit 22 as a cemented lens.

(Numerical Examples)

Numerical data of the zoom lens of Embodiment 1 shown in FIG. 1 is shown in Table 1, numerical data of the zoom lens of Embodiment 2 shown in FIG. 2 is shown in Table 2, and numerical data of the zoom lens of Embodiment 3 shown in FIG. 3 is shown in Table 3.

In these tables, ri denotes the radius of curvature of the i-th surface in order from the object side, di denotes the interval between the i-th surface and (i+1)th surface, and ni and vi are the refractive index and Abbe's number of the glass material forming the i-th surface, respectively.

Furthermore, the surface attached with an "*" indicates that the surface is an aspherical surface. The shape of the aspherical surface satisfies the following expression when the direction of the optical axis is defined as the x axis, the direction perpendicular to the optical axis is defined as the y axis, the light ray advance direction is defined as positive, R is defined as the paraxial radius of curvature, and k, B, C, D, E, F, A', B', C', D', and E' are defined as aspherical coefficients:

$$x = \{(y^2/R)/(1-(1+k)\cdot(y/R)^2)^{1/2}\} + By^4 + Cy^6 + Dy^8 + Ey^{10} + Fy^{12} + A'y^3 + B'y^5 + C'y^7 + D'y^9 + E'y^{11}$$

TABLE 1

Zooming ratio: 21x
Field angle at the wide-angle end: 70.4 degrees
i1 − i2 = 29.3    i3 = 95.0    hw: 5.13    hz: 5.21
fn/f1 = −1.07

| | | | | | | |
|---|---|---|---|---|---|---|
| r1 = | −27.3632 | d1 = | 0.2308 | n1 = 1.73234 | i1 = 54.7 |
| r2 = | 27.3632 | d2 = | 0.7159 | | |
| r3 = | 71.3705 | d3 = | 0.2308 | n2 = 1.81264 | i2 = 25.4 |
| r4 = | 12.9897 | d4 = | 1.9149 | n3 = 1.43985 | i3 = 95.0 |
| r5 = | −20.8550 | d5 = | 0.0192 | | |
| r6 = | 22.4921 | d6 = | 1.0621 | n4 = 1.62033 | i4 = 63.3 |
| r7 = | −44.2413 | d7 = | 0.8682 | | |
| r8 = | 13.6623 | d8 = | 1.3612 | n5 = 1.49845 | i5 = 81.5 |
| r9 = | −38.6827 | d9 = | 0.0192 | | |
| r10 = | 8.5777 | d10 = | 0.8358 | n6 = 1.73234 | i6 = 54.7 |
| r11 = | 20.4377 | d11 = | variable | | |
| *r12 = | 17.4102 | d12 = | 0.0897 | n7 = 1.88815 | i7 = 40.8 |
| r13 = | 1.8153 | d13 = | 0.7775 | | |
| r14 = | −16.8508 | d14 = | 0.8569 | n8 = 1.81643 | i8 = 22.8 |
| r15 = | −1.7598 | d15 = | 0.0897 | n9 = 1.82017 | i9 = 46.6 |
| r16 = | 6.2738 | d16 = | 0.0207 | | |
| r17 = | 3.0458 | d17 = | 0.7632 | n10 = 1.53430 | i10 = 48.8 |
| r18 = | −3.7054 | d18 = | 0.0339 | | |
| r19 = | −3.3339 | d19 = | 0.0897 | n11 = 1.83945 | i11 = 42.7 |
| r20 = | −33.1779 | d20 = | variable | | |
| r21 = | −3.6233 | d21 = | 0.0897 | n12 = 1.74678 | i12 = 49.3 |
| r22 = | 5.8983 | d22 = | 0.3590 | n13 = 1.85504 | i13 = 23.8 |
| r23 = | −168.4231 | d23 = | variable | | |
| r24 = | 0.0000 | d24 = | 0.1667 (aperture stop) | | |
| r25 = | 140.3963 | d25 = | 0.5587 | n14 = 1.66152 | i14 = 50.9 |
| r26 = | −4.4981 | d26 = | 0.0192 | | |
| r27 = | 10.3658 | d27 = | 0.3130 | n15 = 1.51825 | i15 = 64.1 |
| r28 = | −3371.7949 | d28 = | 0.0192 | | |

TABLE 1-continued

| | | | | | | | |
|---|---|---|---|---|---|---|---|
| r29 = | 11.9041 | d29 = | 0.8686 | n16 = | 1.51825 | i16 = | 64.1 |
| r30 = | −4.1625 | d30 = | 0.2308 | n17 = | 1.83932 | i17 = | 37.2 |
| r31 = | −26.2383 | d31 = | 4.5128 | | | | |
| r32 = | 7.8669 | d32 = | 0.8029 | n18 = | 1.51825 | i18 = | 64.1 |
| r33 = | −6.7440 | d33 = | 0.2219 | | | | |
| r34 = | −12.6572 | d34 = | 0.2308 | n19 = | 1.83945 | i19 = | 42.7 |
| r35 = | 4.1168 | d35 = | 0.7369 | n20 = | 1.51977 | i20 = | 52.4 |
| r36 = | −11.6979 | d36 = | 0.5637 | | | | |
| r37 = | 7.9839 | d37 = | 0.8684 | n21 = | 1.48915 | i21 = | 70.2 |
| r38 = | −3.8229 | d38 = | 0.2308 | n22 = | 1.83932 | i22 = | 37.2 |
| r39 = | −45.5666 | d39 = | 0.0192 | | | | |
| r40 = | 6.8645 | d40 = | 0.5644 | n23 = | 1.52033 | i23 = | 58.9 |
| r41 = | −9.4753 | d41 = | 0.5769 | | | | |
| r42 = | 0.0000 | d42 = | 3.8462 | n24 = | 1.60718 | i24 = | 38.0 |
| r43 = | 0.0000 | d43 = | 2.0769 | n25 = | 1.51825 | i25 = | 64.2 |
| r44 = | 0.0000 | d44 = | 0.9614 | | | | |

| Focal length/ Variable interval | 1.00 | 2.14 | 4.06 | 14.60 | 21.00 |
|---|---|---|---|---|---|
| d11 | 0.09 | 3.06 | 4.71 | 6.58 | 6.85 |
| d20 | 7.14 | 3.74 | 1.80 | 0.45 | 0.70 |
| d23 | 0.62 | 1.06 | 1.34 | 0.82 | 0.22 |

Aspherical coefficient of twelfth surface

| R | k | B | C | D |
|---|---|---|---|---|
| 17.410 | 8.589 | $4.141 \times 10^{-3}$ | $-5.492 \times 10^{-4}$ | $1.667 \times 10^{-4}$ |

| E | F | A' | B' |
|---|---|---|---|
| $-1.047 \times 10^{-4}$ | $4.778 \times 10^{-5}$ | $-6.080 \times 10^{-5}$ | $-2.190 \times 10^{-4}$ |

| C' | D' | E' |
|---|---|---|
| $-1.086 \times 10^{-4}$ | $2.765 \times 10^{-4}$ | $-1.157 \times 10^{-4}$ |

TABLE 2

Zooming ratio: 18×
Field angle at the wide-angle end: 72.5 degrees
i1 − i2 = 24.6   i3 = 95.0   hw: 5.50   hz: 5.52
fn/f1 = −1.10

| | | | | | | | |
|---|---|---|---|---|---|---|---|
| r1 = | −28.9573 | d1 = | 0.2400 | n1 = | 1.79025 | i1 = | 50.0 |
| r2 = | 30.0203 | d2 = | 0.8515 | | | | |
| r3 = | 78.0457 | d3 = | 0.2400 | n2 = | 1.81264 | i2 = | 25.4 |
| r4 = | 13.9770 | d4 = | 2.0645 | n3 = | 1.43985 | i3 = | 95.0 |
| r5 = | −20.9743 | d5 = | 0.0200 | | | | |
| r6 = | 24.9264 | d6 = | 1.1292 | n4 = | 1.60520 | i4 = | 65.4 |
| r7 = | −39.7140 | d7 = | 0.7266 | | | | |
| r8 = | 14.2826 | d8 = | 1.4278 | n5 = | 1.49845 | i5 = | 81.5 |
| r9 = | −36.6365 | d9 = | 0.0200 | | | | |
| r10 = | 8.3007 | d10 = | 0.8977 | n6 = | 1.73234 | i6 = | 54.7 |
| r11 = | 18.7300 | d11 = | variable | | | | |
| *r12 = | 17.2263 | d12 = | 0.0933 | n7 = | 1.88815 | i7 = | 40.8 |
| r13 = | 2.0230 | d13 = | 0.7765 | | | | |
| r14 = | −16.8024 | d14 = | 0.8726 | n8 = | 1.81643 | i8 = | 22.8 |
| r15 = | −1.8979 | d15 = | 0.0933 | n9 = | 1.82017 | i9 = | 46.6 |
| r16 = | 5.0474 | d16 = | 0.1466 | | | | |
| r17 = | 3.2941 | d17 = | 0.7571 | n10 = | 1.57047 | i10 = | 42.8 |
| r18 = | −4.0079 | d18 = | 0.0787 | | | | |
| r19 = | −3.1712 | d19 = | 0.0933 | n11 = | 1.88815 | i11 = | 40.8 |
| r20 = | −18.0496 | d20 = | variable | | | | |
| r21 = | −3.5834 | d21 = | 0.0933 | n12 = | 1.74678 | i12 = | 49.3 |
| r22 = | 6.3668 | d22 = | 0.3733 | n13 = | 1.85504 | i13 = | 23.8 |
| r23 = | −97.8600 | d23 = | variable | | | | |
| r24 = | 0.0000 | d24 = | 0.1733 (aperture stop) | | | | |
| r25 = | 168.4641 | d25 = | 0.6109 | n14 = | 1.66152 | i14 = | 50.9 |
| r26 = | −4.4111 | d26 = | 0.0200 | | | | |
| r27 = | 11.1625 | d27 = | 0.3447 | n15 = | 1.51977 | i15 = | 52.4 |

TABLE 2-continued

| | | | | | | | |
|---|---|---|---|---|---|---|---|
| r28 = | −1200.0000 | d28 = | 0.0200 | | | | |
| r29 = | 10.5857 | d29 = | 0.7931 | n16 = | 1.52458 | i16 = | 59.8 |
| r30 = | −3.9079 | d30 = | 0.2400 | n17 = | 1.83945 | i17 = | 42.7 |
| r31 = | −21.0878 | d31 = | 3.3333 | | | | |
| r32 = | 10.2483 | d32 = | 0.7729 | n18 = | 1.51825 | i18 = | 64.1 |
| r33 = | −5.8053 | d33 = | 0.1364 | | | | |
| r34 = | −9.2298 | d34 = | 0.2400 | n19 = | 1.83945 | i19 = | 42.7 |
| r35 = | 4.2865 | d35 = | 1.1027 | n20 = | 1.51825 | i20 = | 64.1 |
| r36 = | −7.7621 | d36 = | 0.3999 | | | | |
| r37 = | 10.0271 | d37 = | 0.8147 | n21 = | 1.48915 | i21 = | 70.2 |
| r38 = | −3.8930 | d38 = | 0.2400 | n22 = | 1.83932 | i22 = | 37.2 |
| r39 = | −25.1689 | d39 = | 0.0366 | | | | |
| r40 = | 7.0822 | d40 = | 0.6865 | n23 = | 1.51825 | i23 = | 64.1 |
| r41 = | −8.9491 | d41 = | 0.6000 | | | | |
| r42 = | 0.0000 | d42 = | 4.0000 | n24 = | 1.60718 | i24 = | 38.0 |
| r43 = | 0.0000 | d43 = | 2.1600 | n25 = | 1.51825 | i25 = | 64.2 |
| r44 = | 0.0000 | d44 = | 1.0136 | | | | |

| Focal length/ Variable interval | 1.00 | 2.06 | 4.06 | 14.70 | 18.00 |
|---|---|---|---|---|---|
| d11 | 0.08 | 2.94 | 4.72 | 6.59 | 6.75 |
| d20 | 7.16 | 3.89 | 1.82 | 0.47 | 0.61 |
| d23 | 0.29 | 0.71 | 1.01 | 0.48 | 0.18 |

Aspherical coefficient of twelfth surface

| R | k | B | C | D |
|---|---|---|---|---|
| 17.226 | 8.589 | $3.651 \times 10^{-3}$ | $-6.001 \times 10^{-4}$ | $1.193 \times 10^{-4}$ |

| E | F | A' | B' |
|---|---|---|---|
| $-6.848 \times 10^{-5}$ | $2.671 \times 10^{-5}$ | $-3.332 \times 10^{-4}$ | $-1.912 \times 10^{-4}$ |

| C' | D' | E' |
|---|---|---|
| $-9.353 \times 10^{-5}$ | $2.253 \times 10^{-4}$ | $-7.330 \times 10^{-5}$ |

TABLE 3

Zooming ratio: 20×
Field angle at the wide-angle end: 67.7 degrees
i1 − i2 = 9.9   i3 = 65.4   hw: 4.78   hz: 5.07
fn/f1 = −1.23

| | | | | | | | |
|---|---|---|---|---|---|---|---|
| r1 = | −30.1125 | d1 = | 0.21951 | n1 = | 1.75453 | i1 = | 35.3 |
| r2 = | 28.3260 | d2 = | 0.80928 | | | | |
| r3 = | 56.8148 | d3 = | 0.21951 | n2 = | 1.81264 | i2 = | 25.4 |
| r4 = | 14.9249 | d4 = | 1.69238 | n3 = | 1.60520 | i3 = | 65.4 |
| r5 = | −19.2336 | d5 = | 0.91378 | | | | |
| r6 = | 14.8215 | d6 = | 0.91117 | n4 = | 1.49845 | i4 = | 81.5 |
| r7 = | 599.6105 | d7 = | 0.01829 | | | | |
| r8 = | 12.8169 | d8 = | 0.77823 | n5 = | 1.60520 | i5 = | 65.4 |
| r9 = | 58.8537 | d9 = | 0.01829 | | | | |
| r10 = | 8.4780 | d10 = | 0.71456 | n6 = | 1.73234 | i6 = | 54.7 |
| r11 = | 19.3234 | d11 = | variable | | | | |
| *r12 = | 27.8681 | d12 = | 0.08537 | n7 = | 1.88815 | i7 = | 40.8 |
| r13 = | 1.9627 | d13 = | 0.72265 | | | | |
| r14 = | −15.0271 | d14 = | 0.80385 | n8 = | 1.81264 | i8 = | 25.4 |
| r15 = | −1.8450 | d15 = | 0.08537 | n9 = | 1.75844 | i9 = | 52.3 |
| r16 = | 3.7430 | d16 = | 0.08325 | | | | |
| r17 = | 2.8552 | d17 = | 0.6843 | n10 = | 1.60718 | i10 = | 38.0 |
| r18 = | −4.8336 | d18 = | 0.1069 | | | | |
| r19 = | −3.0309 | d19 = | 0.08537 | n11 = | 1.83945 | i11 = | 42.7 |
| r20 = | −16.4257 | d20 = | variable | | | | |
| r21 = | −3.4527 | d21 = | 0.08537 | n12 = | 1.74678 | i12 = | 49.3 |
| r22 = | 5.7000 | d22 = | 0.34146 | n13 = | 1.85504 | i13 = | 23.8 |
| r23 = | −321.3362 | d23 = | variable | | | | |
| r24 = | 0.0000 | d24 = | 0.15854 (aperture stop) | | | | |
| r25 = | 43.9054 | d25 = | 0.53392 | n14 = | 1.66152 | i14 = | 50.9 |
| r26 = | −4.2550 | d26 = | 0.01829 | | | | |

TABLE 3-continued

| | | | | | | |
|---|---|---|---|---|---|---|
| r27 = | 11.3523 | d27 = | 0.26799 | n15 = 1.51825 | i15 = | 64.1 |
| r28 = | −454.6526 | d28 = | 0.01829 | | | |
| r29 = | 10.9151 | d29 = | 0.73123 | n16 = 1.51825 | i16 = | 64.1 |
| r30 = | −3.9122 | d30 = | 0.21951 | n17 = 1.83932 | i17 = | 37.2 |
| r31 = | −25.7207 | d31 = | 4.29268 | | | |
| r32 = | 6.1897 | d32 = | 0.71707 | n18 = 1.51825 | i18 = | 64.1 |
| r33 = | −6.5219 | d33 = | 0.2032 | | | |
| r34 = | −9.4702 | d34 = | 0.21951 | n19 = 1.83945 | i19 = | 42.7 |
| r35 = | 3.5244 | d35 = | 0.76257 | n20 = 1.51977 | i20 = | 52.4 |
| r36 = | −10.7857 | d36 = | 0.50836 | | | |
| r37 = | 10.5784 | d37 = | 0.84487 | n21 = 1.48915 | i21 = | 70.2 |
| r38 = | −3.7200 | d38 = | 0.21951 | n22 = 1.83932 | i22 = | 37.2 |
| r39 = | −17.4607 | d39 = | 0.02156 | | | |
| r40 = | 6.3961 | d40 = | 0.59703 | n23 = 1.52033 | i23 = | 58.9 |
| r41 = | −8.6239 | d41 = | 0.54878 | | | |
| r42 = | 0.0000 | d42 = | 3.65854 | n24 = 1.60718 | i24 = | 38.0 |
| r43 = | 0.0000 | d43 = | 1.97561 | n25 = 1.51825 | i25 = | 64.2 |
| r44 = | 0.0000 | d44 = | 0.91424 | | | |

| Focal length/ Variable interval | 1.00 | 2.11 | 4.06 | 13.33 | 20.00 |
|---|---|---|---|---|---|
| d11 | 0.08 | 2.85 | 4.47 | 6.16 | 6.47 |
| d20 | 6.74 | 3.57 | 1.69 | 0.43 | 0.73 |
| d23 | 0.54 | 0.93 | 1.19 | 0.76 | 0.16 |

Aspherical coefficient of twelfth surface

| R | k | B | C | D |
|---|---|---|---|---|
| 27.868 | 8.589 | $3.889 \times 10^{-3}$ | $-6.685 \times 10^{-4}$ | $1.869 \times 10^{-4}$ |

| E | F | A' | B' |
|---|---|---|---|
| $-1.344 \times 10^{-4}$ | $6.539 \times 10^{-5}$ | $-3.026 \times 10^{-5}$ | $7.506 \times 10^{-5}$ |

| C' | D' | E' |
|---|---|---|
| $-2.698 \times 10^{-4}$ | $4.075 \times 10^{-4}$ | $-1.610 \times 10^{-4}$ |

Furthermore, in Embodiment 1, Embodiment 2 and Embodiment 3, aberration diagrams when the lenses are at the wide-angle end and focused to infinity, aberration diagrams when the lenses are focused to infinity at a focal length of $fw \times Z^{1/4}$, and aberration diagrams when the lenses are at the telephoto end and focused to infinity are shown in FIGS. 4 through FIGS. 12.

In all cases, although distortion components in chromatic aberration of magnification at the wide-angle end are small, positive distortion at a focal length of $fw \times Z^{1/4}$ and axial chromatic aberration at the telephoto end are satisfactorily corrected.

As described above, according to each embodiment, a zoom lens which is small in size and lightweight while having high optical performance, a wide field angle, and a high magnification is realized.

Figure 19:
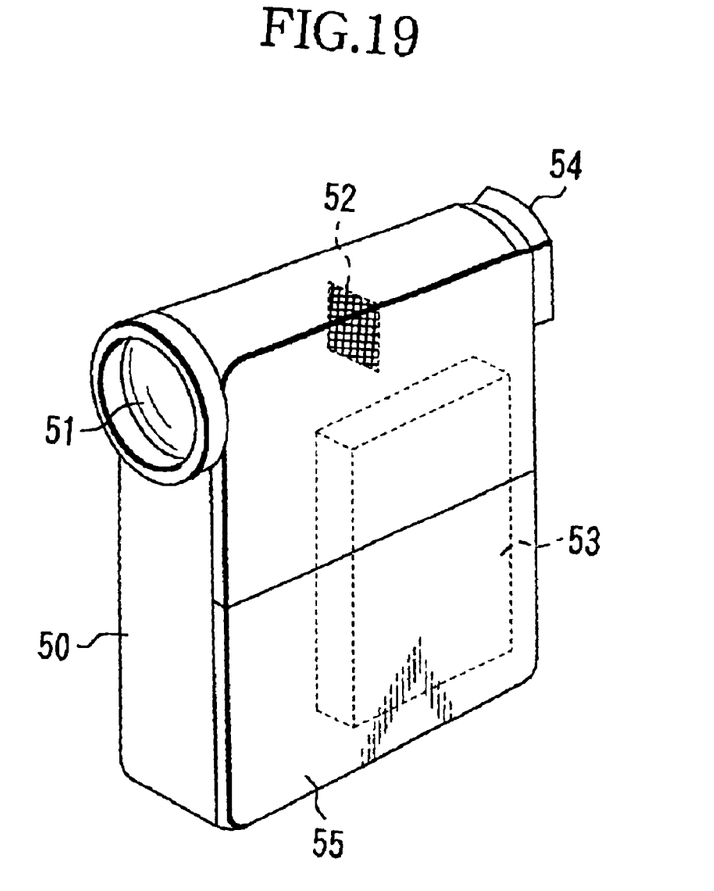
FIG. 19 is a schematic view of an image pickup apparatus using the zoom lens of each abovementioned Embodiment.

FIG. 19 shows a video camera (image pickup apparatus) using the zoom lens described in each embodiment as an image-taking optical system.

In FIG. 19, numerical reference 50 denotes the main body of the video camera, 51 denotes an image-taking optical system comprising the zoom lens described in each embodiment, and 52 denotes an image pickup element as a photoelectrically converting element such as a CCD or a CMOS sensor, etc., which receives and photoelectrically converts an object image formed by the image-taking optical system 51.

A recording medium 53 is a semiconductor memory, a magnetic disk, or an optical disk, etc., which records image signals obtained through the image pickup element 52. A finder 54 is for observation of an object image displayed on an internal display panel (not shown) such as a liquid crystal panel, etc., in response to the image signals obtained through the image pickup element 52.

An external display panel 55 has a function equivalent to that of the finder 54, and is a liquid crystal panel, etc., which displays object images and various image-taking information. This external display panel 55 can be housed in and developed from the video camera main body 50, and the housed condition is shown in the figure.

By using the above-described zoom lens as an image-taking optical system, an image pickup apparatus which is small in size and lightweight while having high image pickup performance and enables image-taking with a wide field angle and a high magnification is realized.

The zoom lens described in each embodiment mentioned above can be used for various image pickup apparatuses including digital still cameras, television cameras, and film cameras as well as video cameras.

While preferred embodiments have been described, it is to be understood that modification and variation of the present invention may be made without departing from the scope of the following claims.

What is claimed is:

1. A zoom lens comprising:
a first lens unit having positive optical power, a second lens unit having negative optical power and a magnification varying function, and at least one other lens unit, arranged in order from the object side, wherein
the first lens unit includes, in order from the object side, a first negative lens element whose first surface at the extreme object side is concave toward the object side, and a second negative lens element, and at least one positive lens element which is closer to an image plane side than the second negative lens element, and satisfies an following condition:

$$-1.28 < fn/f1$$

where fn denotes the composite focal length of the first negative lens element and the second negative lens element, and f1 denotes the focal length of the first lens unit.

2. The zoom lens according to claim 1, satisfying the following condition:

$$v1 - v2 > 8$$

$$v3 > 60$$

where v1 and v2 denote Abbe's numbers of the first negative lens element and the second negative lens element, respectively, and v3 denotes Abbe's number of the positive lens element which is disposed closer to the image plane side than the second negative lens element and the closest to the object side within the first lens unit excluding the first negative lens element and the second negative lens element.

3. The zoom lens according to claim 1, wherein
the second negative lens element and the positive lens element, constituting part of the first lens unit, are cemented together.

4. The zoom lens according to claim 1, satisfying the following condition:

$$hw < hz$$

where hw and hz denote the maximum heights of off-axis light rays at the maximum image height, which pass through the first surface of the first lens unit when the zoom lens is focused to infinity at the wide-angle end and at a focal length of $fw \times Z^{1/4}$, respectively, and fw denotes a focal length of the entire system of the zoom lens at the wide-angle end.

5. The zoom lens according to claim 1, satisfying the following conditions:

$$Z>10$$

$$fw/IS<0.75$$

where Z denotes a zooming ratio, fw denotes a focal length of the entire system at the wide-angle end, and IS denotes an image size.

6. The zoom lens according to claim 1, wherein the first lens unit which includes a first lens component having negative optical power and a second lens component with positive optical power and has a focusing function, wherein the first lens component includes, in order from the object side, a first negative lens element whose first surface at the extreme object side is concave toward the object side, a second negative lens element, and at least one positive lens element, and is fixed when focusing, and the second lens component includes a plurality of positive lens elements, and moves on the optical axis when focusing.

7. An image pickup apparatus comprising:

a zoom lens according to claim 1, and a photoelectric conversion element which receives and photoelectrically converts an object image formed by the zoom lens.

* * * * *